United States Patent [19]

Thomas et al.

[11] Patent Number: 4,881,163

[45] Date of Patent: Nov. 14, 1989

[54] COMPUTER SYSTEM ARCHITECTURE EMPLOYING CACHE DATA LINE MOVE-OUT QUEUE BUFFER

[75] Inventors: Jeffrey A. Thomas; Theodore S. Robinson, both of Cupertino; Robert A. Ertl, Santa Clara; Harold F. Christensen, Jr., Fremont, all of Calif.

[73] Assignee: Amdahl Corporation, Sunnyvale, Calif.

[21] Appl. No.: 909,500

[22] Filed: Sep. 19, 1986

[51] Int. Cl.⁴ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,680,055 | 7/1972 | Wilson | 364/200 |
| 3,938,097 | 2/1976 | Niguette, III | 364/200 |
| 4,040,027 | 8/1977 | Van Es et al. | 364/900 |
| 4,217,640 | 8/1980 | Porter et al. | 364/200 |
| 4,298,929 | 11/1981 | Capozzi | 364/200 |
| 4,467,414 | 8/1984 | Akagi et al. | 364/200 |

OTHER PUBLICATIONS

Fletcher R. P. and Marti D. B., "Stove Buffer," IBM Technical Disclosure Bulletin, vol. 25, No. 9,. pp. 4522–4526.

*Primary Examiner*—David L. Clark
*Attorney, Agent, or Firm*—Fliesler, Dubb, Meyer & Lovejoy

[57] ABSTRACT

A queue buffer used for the controlled buffering and transferal of data between a cache memory of a central processor unit and a mainstore memory unit. The queue buffer of the present invention preferably includes a buffer memory for the queued storage of data and a controller for directing the nominally immediate acceptance and storage of data received direct from a cache memory and for the nominally systematic background transfer of data from the queue buffer to the mainstore memory unit. This nominal prioritization of memory transfers with respect to the queue buffer memory allows data move-in requests requiring data from the main storage unit to proceed while required move-out data is moved from a cache memory immediately to the buffer queue memory.

10 Claims, 2 Drawing Sheets

COMPUTER SYSTEM ARCHITECTURE EMPLOYING CACHE DATA LINE MOVE-OUT QUEUE BUFFER

FIELD OF INVENTION

The present invention generally relates to improvements in computer architectures utilizing cache memory subsystems for the temporary storage and retrieval of data where the data would be otherwise stored and retrieved from a mainstore memory unit. In particular, the present invention relates to a queue buffer interposed in the data path between the cache memory subsystems and the mainstore memory unit for buffering data moved-out from the cache memories.

BACKGROUND OF THE INVENTION

High speed computer systems and, in particular, those referred to as "main-frame" systems typically employ cache memories as integral parts of their overall system architectures. Cache memories are typically low capacity data storage devices that are particularly optimized for high speed data access. One or more cache memories are typically closely coupled to each respective central processing unit (CPU) of the system to permit extremely high rates of data exchange. Conversely, the mainstore is a relatively low access speed, high capacity optimized storage unit utilized in common by all of the CPUs of the system. This implies the further requirement of a mainstore access prioritization and arbitration mechanism that, by its operation, may further adversely impact the required length of time for accessing mainstore. The data processing through-put of each CPU is thus greatly enhanced whenever its memory requirements can be met by accessing its closely associated, or local, cache memory. Generally, all other memory requests, i.e., those that cannot be satisfied from a local cache memory, must be satisfied by accessing the much slower mainstore memory unit.

Conventionally, operation of the CPU generally involves requests for two basic types of mainstore memory accesses. The first type is a fetch, or move-in, of program instructions and data or, generically, just data. The second is to store, or move-out, potentially modified data. The move-in of data from mainstore in response to a CPU request is typically treated as a high priority function within the data processing system. This assignment of priority is to ensure that the immediate data requirements of the CPU are kept current. Typically with the move-in of data, a data copy is kept in a local cache memory of the requesting CPU. Significantly, there is a substantial likelihood of the CPU again requesting these most recently moved-in data, hence the value of cache memories.

When the cache memory is full and a move-in request must be satisfied from mainstore, at least a corresponding amount of cache memory space must be first freed by the prior performance of a data move-out operation to the mainstore memory unit. Since conventional mainstore memory units are primarily optimized for storage capacity while cache buffers are highly optimized for speed, special memory access functions are not available. That is, without dual independent read/write port memory capability in both the cache buffers and mainstore memory unit, a simultaneous move-in and move-out of data cannot be accomplished. Thus, execution of a data move-out must be completed before beginning the move-in of data, so as to free adequate memory space within the cache buffer. Typically, a simple data latch is utilized to temporarily store the move-out data without requiring a mainstore memory access. This allows the move-in of data to proceed without significant delay. However, the move-out data must then be immediately written to mainstore upon completion of the move-in mainstore access. Otherwise, the move-out data will be held inaccessible to all CPUs until it is finally written out. Further, while it is so held in the temporary latch, it must be protected from being overwritten and, therefore, will block any subsequent move-in request requiring a prior cache buffer data move-out. The overall operating performance of the data processing system is, consequently, significantly degraded by the required performance of a data move-out either before or immediately after the satisfaction of each move-in request when the cache memory of the requesting CPU is full at the moment of the request.

A pervasive problem associated with the above mainstore access contention problem, and the use of cache memory subsystems in general, is the requirement for providing system-wide data integrity. The copying of data into even the first of potentially multiple cache memories means that multiple alterable copies could be present within the data processing system. Thus, a mechanism within the architecture of the data processing system is required to ensure that only the most current copy of any particular data is provided in response to any request for a data copy in alterable form. A variety of such mechanisms, or data integrity schemes, are known. Typically, a data integrity bit field, within an address tag, is associated with each unit of data present outside of mainstore. The bit subfields of a tag typically reference the system address of the data and indicate whether the present copy of the data may be modified. However, significant with respect to the present invention, all modifications and enhancements of a cache based system architecture are substantially complicated by the requirement of supporting whatever data integrity mechanism is in use.

SUMMARY

A purpose of the present invention is, therefore, to provide a move-out queue buffer within a cache based data processing computer architecture to substantially improve the overall operating performance of the computing system.

This is accomplished in the present invention by providing a queue buffer in a data processing system for the controlled buffering and transferal of data between a cache memory of a central processor unit and a mainstore memory unit, where a central processor unit issues requests regarding specified data that can be satisfied by accessing either its associated cache memory or the mainstore memory unit, or both. The queue buffer of the present invention preferably includes a buffer memory for the queued storage of data and a controller for directing the nominally immediate acceptance and storage of data received direct from a cache memory and for the nominally systematic background transfer of data from the queue buffer to the mainstore memory unit. This nominal prioritization of memory transfers with respect to the queue buffer memory allows several move-in requests requiring data from the main storage unit to proceed sequentially and uninterrupted by a mainstore write access while the corresponding required move-out data is moved from a cache memory immediately to the buffer queue memory.

Consequently, an advantage of the present invention is that it substantially relieves contention for mainstore data access.

Another advantage of the present invention is that it provides a mechanism for maintaining data integrity with respect to data copies present in the queue buffer without degradation of overall operating performance. This is obtained by providing for data integrity searches of the move-out queue buffer in parallel with data integrity searches of the cache memories.

A further advantage of the present invention is that the move-out queue buffer controller operates to clear the buffer continuously as a background task while further providing for and managing temporary move-out priority changes.

Yet another advantage of the present invention is that the move-out queue buffer controller is closely coupled to the move-in data controller, or server, to allow bypassing of the mainstore memory unit where the most current copy of requested data is present in the move-out queue buffer.

A still further advantage of the present invention is that its implementation makes optimal use of necessary and existing architectural features required for the support of cache memories, such that the operation of the move-out queue buffer is substantially transparent to all other processes within the data processing system.

BRIEF DESCRIPTION OF THE DRAWINGS

These and other attendant advantages and further features of the present invention will become better understood by reference to the following detailed description of the invention when considered in conjunction with the accompanying drawings, wherein like reference numerals indicate like parts throughout the figures thereof, and wherein.

DETAILED DESCRIPTION OF THE INVENTION

Figure 1:
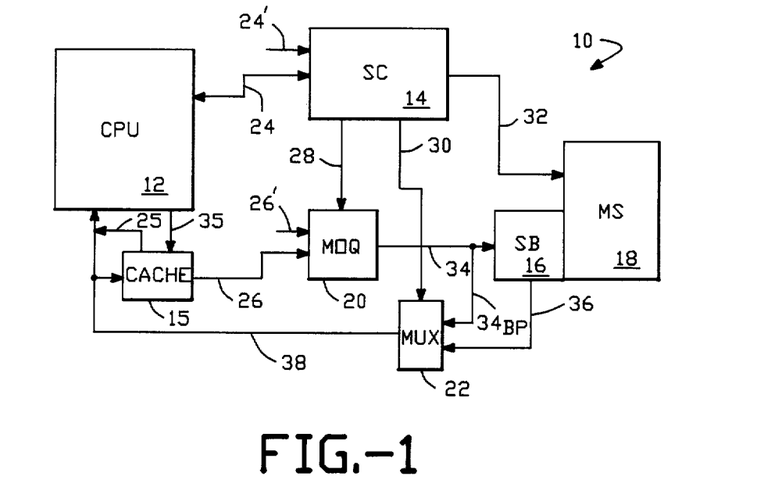
FIG. 1 is a simplified block diagram of an exemplary data processing system incorporating the present invention.

A simplified block diagram of a data processing system 10 is illustrated in FIG. 1. The system 10 includes at least one central processing unit (CPU) 12 that preferably includes one or more cache memories, such as cache memory 15, a mainstore memory unit (MS) 18 and a system controller (SC) 14 for controlling the accessing of the mainstore 18 and for managing the transfer of data to and from the CPU 12. Preferably, a local cache controller, within and maintained by the CPU 12, initially determines whether imminently required data transfers can be satisfied by accessing the local cache 15. Any data transfer between the CPU 12 and cache memory 15 occurs over the CPU data input and output busses 25, 35. Where the data requirements of the CPU 12 cannot be met by accessing the cache memory 15, the CPU 12 issues a corresponding data request to the system controller 14. The request is paced via control and address tag lines 24 and, in turn, prompts a control response effectively indicating whether the request is accepted for processing by the system controller 14. When an accepted request is subsequently processed, requiring a read or write access of the mainstore 18, control signals and the control and address tag portion of the request are passed between the system controller 14 and mainstore 18 via the control and data address tag lines 32. Further, in satisfying a move-in data request, the corresponding address tag is then passed back to the CPU 12 from the system controller 14 via the control and address lines 24.

In accordance with the present invention, move-out data requests initiated by the CPU 12 are satisfied by a transfer of the specified data from the cache memory 15 of the CPU 12 to a move-out queue (MOQ) 20 via a cache output data bus 26, while the address tag is passed to the system controller 14 via the control and address tag lines 24. The receipt and storage of the moved-out data in the move-out queue 20 is managed, in general, by the system controller 14 via the control lines 28. The further, subsequent transfer of data from the move-out queue 20 to mainstore 18, by the performance of a move-out queue read, is generally a low priority task relative to the overall operation of the system 10, and, in particular, to requests for the move-out and move-in of data. When transferred out from the move-out queue, data is passed via the data bus 34 and a data switch box 16 and, based on its corresponding address tag as earlier provided on the control and tag lines 32 of the system controller 14, is stored at an appropriate location in the mainstore 18.

A move-in data request by the CPU 12, where an access of the mainstore 18 is required, prompts the system controller 14 to invoke a mainstore read access that provides the request specified data on the switch box data output bus 36 and the corresponding address tag via the tag portion of the control and tag lines 32. The requested data is then routed onto the CPU data bus 38 via the multiplexer 22 in response to an appropriate control signal on line 30 from the system controller 14. Preferably, the multiplexer 22 is an integral component of the switch box 16, but is shown here separately for purposes of clarity.

In accordance with the present invention, the data specified by a move-in data request may be alternately obtained directly from the move-out queue 20 rather than from the mainstore 18. A data bypass bus $34_{BY}$ is provided to couple the data output bus 34 of the move-out queue 20 to a second input of the multiplexer 22. The multiplexer 22 is thus able to select and directly return data from the move-out queue 20 to the CPU 12, with a copy also being provided to the cache memory 15. Significantly, the bypass provision of data from the move-out queue 20 is faster than a full write/read access of mainstore 18.

A preferred embodiment of the present invention provides for the interconnection of a second CPU and cache memory 12', 15' (not shown) to the system controller, move-out queue and multiplexer 14, 20, 22 of the system 10. The CPU 12' is separately connected to the system controller 14 by control and address tag lines 24' while the cache memory 15' is separately connected to the move-out queue 20 by a move-out data bus 26'. The CPU and cache memory 12', 15', however, receive data in common with the CPU and cache 12, 15 via the mainstore move-in data bus 38. The provision of the secondary CPU and cache 12', 15', however, are not essential to the operation of the present invention.

Rather, the available option of providing a secondary CPU wholly within the precepts of the present invention is noted to illustrate the flexibility and robustness of the present invention.

The general features of the present invention with regard to preserving data integrity are best illustrated through a description of move-in and move-out data operations. Generally, the data requirements of the CPU 12 are satisfied by the transfer of data to and from the cache memory 15 via the CPU data buses 25, 35. However, where the CPU cache controller determines that a required memory operation cannot be satisfied by accessing its local cache memory 15, the CPU 12 issues, for example, a move-in data request to the system controller 14. In response, the system controller 14 instigates a system data integrity search of all of the cache memories 15, 15' present within the system 10 as well as a search for the request specified data in the move-out queue 20. The searches are performed preferably in parallel to determine where the most current, or valid, copy of the requested data resides. Where the data integrity search results indicate that the only valid copy of the requested data is present in the mainstore 18, the system controller 14 directs the request specified data to be transferred from the mainstore 18, through the switch box 16 and multiplexer 22 and onto the CPU input data bus 38 where it is received both by the CPU 12 and cache 15 for respective present and potential future use.

Alternately, where the requested data is determined present and valid in the move-out queue 20, the system controller 14 directs the request specified data to be provided by the move-out queue 20 onto its output bus 34 while the multiplexer 22 is selected to bypass the data to the CPU input data bus 38. Where so bypassed, the data is quite quickly obtained by the CPU 12 as compared to a mainstore memory write access followed by a read access to obtain the desired data as is typical in conventional systems.

In an alternate embodiment of the present invention, in order to take advantage of the selection and output of data from the move-out queue 20 onto its output bus 34, the system controller 14 may further attempt a write access of the mainstore 18 to update the request specified data copy then present in the mainstore 18. This, however, is a largely separate operation that may or may not complete immediately. However, regardless of timing or manner of instigation, a subsequent mainstore write access does complete, it will free up the corresponding memory location, or data slot, in the move-out queue 20 for the subsequent receipt of data from a corresponding cache memory 15, 15'.

Finally, where the request specified data is determined to be in a cache memory not of the requesting CPU, a move-out request is solicited from the appropriate CPU. When the data is moved-out to the move-out queue 20, a copy is simultaneously bypassed by a multiplexer (not shown) onto the CPU data input bus 38 for receipt by the requesting CPU.

The foregoing three types of data move-in operations all require that there be adequate memory space within the cache memory 15 of the requesting CPU 12 for the completion of the operation. Where this is not the case, the cache controller of the CPU 12, in its move-in request, preferably indicates that a swap move-out is necessary to clear cache memory space prior to satisfying the move-in request with the data requested by the CPU 12. As before, the initial move-in request is issued to the system controller 14 via the address and control lines 24. In accordance with the present invention, the cache controller of the CPU 12 continues to issue the move-in request until the CPU 12 recognizes that the request was, in fact, accepted by the system controller 14. When ultimately accepted, since the included swap move-out aspect of the request must be honored before the CPU 12 can receive its requested move-in data, the swap move-out is accorded an immediate execute priority among the various tasks of the system controller 14. Preferably, the swap move-out of data is immediately acted on by the system controller 14 whereupon the swap move-out data is transferred from the cache 15 to an available data storage slot of the move-out queue 20 via the cache output data bus 26. Naturally, once the move-in request is accepted, the system controller 14 can begin processing the request for the move-in of the required data. Preferably, the swap move-out path to the buffer memory of the move-out queue 20 is substantially optimized for high access speed. Thus, the execution of a move-in request, including a swap move-out, will almost always find an adequate amount of free memory space within the cache 15. Consequently, the present invention substantially alleviates the mainstore access contention even where a series of move-in requests, each requiring a swap move-out, occur.

Since the move-out queue 20 is of limited storage capacity, the system controller 14 of the present invention preferably self-initiates data reads of the move-out queue 20 to cause the transfer of data from the move-out queue 20 to the mainstore 18 via the move-out queue output data bus 34. Preferably, these move-out queue read operations are initiated by the system controller 14 at a generally low priority or background level. That is, in the absence of any other request requiring access to the mainstore 18, the system controller 14 will initiate a move-out queue read to thereby take advantage of the otherwise unutilized time of the mainstore 18. Consequently, the move-out queue 20 will preferably remain substantially empty, though filling and emptying at a rate directly in response to the mainstore memory-related activity level of the CPUs 12, 12'.

A potential problem arises whenever all of the data storage slots of the move-out queue 20 are filled with previously moved-out data. Another data move-out request could not be honored without overwriting some data present in the move-out queue 20 and the corresponding likely loss of data integrity. Consequently, in accordance with the present invention, the system controller 14 selectively alters the priority level of the self-initiated move-out queue read operation to temporarily take precedence over most any other request presented to the system controller 14 including, in particular, data move-in requests by the CPUs 12, 12'. This temporary high-priority condition obtains when and as the system controller determines that the move-out queue 20 is too full to accept any additional move-out data. A move-out queue read operation will immediately follow any swap data move-out operation that approaches filling the queue 20. The temporary high priority condition is then ended and the priority level of the move-out queue 20 is returned to its nominal low level. This immediate servicing of the temporarily high priority move-out queue read request therefore ensures that adequate data storage slots in the move-out queue 20 will always be available in anticipation of move-in requests by the CPU 12 requiring a swap move-out.

Figure 2:
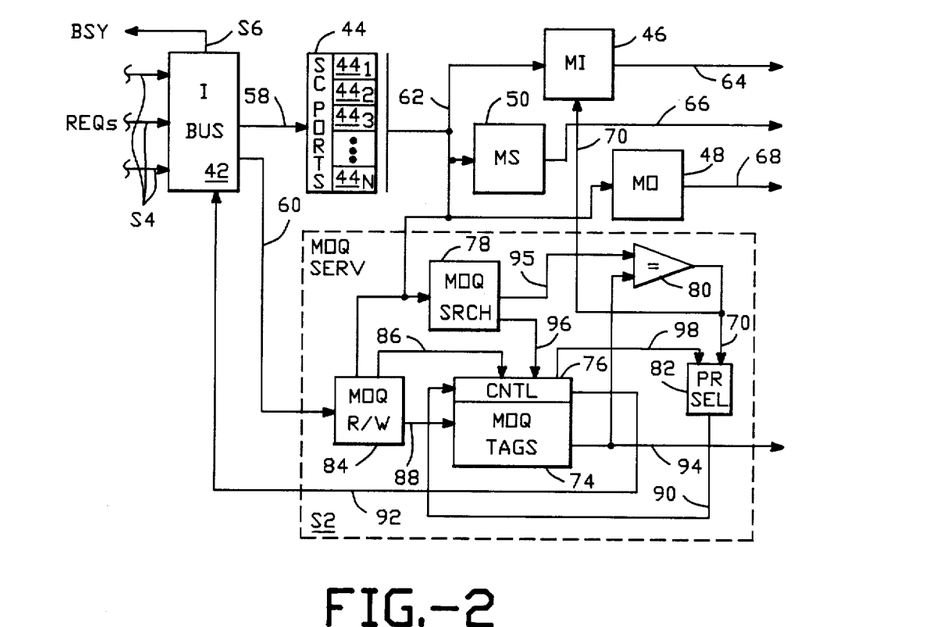
FIG. 2 is a more detailed block diagram of the system controller portion of the present invention.

Many of the internal components of the system controller 14, significant to the present invention, are shown with regard to their logical and functional interrelation in FIG. 2. To the extent and in the manner shown, the system controller 14 includes an I-BUS 42 that provides for request priority arbitration and request acknowledgement/denial, a system control port array 44 (SC ports) for storing accepted requests, and several servers, or individualized controllers 46, 50, 48, 52, for respectively managing move-in (MI), mainstore (MS), move-out (MO) and move-out queue (MOQ) operations.

All requests issued to the system controller 14 are received by the I-BUS 42 on its request input lines 54. Preferably, each line 54 originates from a separate request source within the data processing system 10, such as CPU 12, with each request input line being assigned a fixed relative priority level by the I-BUS 42. Arbitration by the I-BUS 42 preferably takes into consideration whether a request with a higher relative priority level is received within the same priority arbitration request cycle, whether a potentially available port of the system controller port 44 is in fact available and whether acceptance of the request would raise a conflict over the accessing of mainstore 18 with respect to a previously accepted request now currently pending in the SC ports 44. In those cycles where a request can be arbitrated and accepted, an I-BUS busy (BSY) signal, as provided via the lines 56, is withdrawn from the requestors. If a request is accepted, the I-BUS reasserts the I-BUS busy signal. Alternatively, the I-BUS busy signal is withheld as an indication that no request was accepted. In any case, the requestors, in turn, preferably relinquish their current requests and await the next arbitration cycle to post or re-post their requests. However, any denied requestor can reassert its request generally during any subsequent arbitration cycle until the request is finally accepted.

The acceptance of a specific request by the I-BUS 42 is preferably determined by the individual requestors with regard to their respective requests. That is, the requestors generally restart the activity that resulted in the prior generation of the request. If it completes, the corresponding request must have been satisified. Else, the request will be simply generated again.

On acceptance of the request, the I-BUS 42 provides the next available port of the system ports 44 with the particular request and corresponding address tag information, as provided by the requestor in conjunction with the request, via the system port input lines 58. The system port held information is retained until the corresponding request is satisfied. The port is then freed to receive a next arbitration cycle accepted request. Preferably, the system controller ports 44 include eight potentially available ports.

The various servers of the system controller 14 are preferably implemented to operate as substantially independent state machines devoted to the support of their corresponding functions. Each server 46, 48, 50, 52 is coupled via a multiple port selector bus 62 to each of the ports 44$_{1-n}$. Thus, as a request is made available in a port 44$_{1-n}$, each of the servers 46, 48, 50, 52 may independently evaluate the nature of the request and proceed to initiate system controller operations consistent therewith. For example, a simple move-in request is individually recognized by at least the move-in, mainstore, and move-out queue servers 46, 50, 52. The move-in server 46, recognizing the newly pending move-in request, sets up for a transfer of data to the CPU 12 and cache memory 15, pending the requested data becoming available. The mainstore server 50 independently initiates an immediate read of the mainstore memory for the request specified data. Finally, the move-out queue server 52 initiates, in parallel with the system controller data integrity search of the various cache memories, a data integrity search of the move-out queue 20 for the request specified data.

In greater detail, the move-out queue server 52 includes a move-out queue tag buffer 74 for holding the respective address tags associated with the data stored in each storage location of the move-out queue 20. The move-out queue tag buffer 74 is functionally managed by a move-out queue tag controller 76 that, in general, provides for the controlled storing of a tag received via the tag input bus 88 to an available location within the tag buffer 74, writing a selected tag from a specified location onto the tag buffer output bus 94, determining which memory locations of the tag buffer 74 are currently unused for the storage of a tag, and providing an indication via line 98 that the tag buffer 74 is full sufficient to require a high priority MOQ read to be requested. A move-out queue search control unit 78 is functionally utilized to direct each data integrity search of the move-out queue tag buffer 74. Accordingly, the move-out queue search control unit 78 is preferably alerted to the need for a data integrity search when the request is first placed in the SC ports 44. A copy of the request, including the data address tag specifying the requested data, is provided to the MOQ search control unit 78 via the port select bus 62. Preferably, the MOQ search control unit 78 directs the move-out queue tag controller 76, via control lines 96, to write each tag present in the move-out queue tag buffer 74 onto the tag buffer output bus 94. A tag comparitor 80 receives an address tag from the move-out queue search controller 78 and, sequentially, each of the address tags provided on the tag buffer output bus 94. The result of each comparison is utilized as the basis for a priority request level select function, here shown as functionally implemented by a simple priority selector circuit 82, within the move-out queue server 52. The output of the priority selector 82 on control lines 90 effectively directs the move-out queue tag buffer controller 76 to effect a high priority move-out queue read request via request line 92. Thus, a copy of the requested data is transferred from the move-out queue 20 onto the MOQ output lines 34. Additionally, the search comparision result is provided ultimately, here shown as directly, to the move-in server 46. The purpose of providing the move-in server 46 with the search comparison result is to allow the provision of a bypass control signal by the move-in server on control line 64 to select the data bus multiplexer 22 for a move-out queue data bypass. Consequently, the requested data is returned directly to the CPU 12.

A data move-out generally occurs as a swap move-out in conjunction with a move-in request. Preferably, in order to shorten the time required to complete a move-out as part of a data swap or otherwise, the address tag specifying the data to be moved-out is provided by the I-BUS 42 directly to a move-out queue write control unit 84 of the move-out queue server 52 via a tag bus 60. Thus, the address tag is immediately available and waiting for the move-out queue read/write control unit 84, via control lines 86, to write the tag into the move-out queue tag buffer 74. Consequently, a move-out request from the CPU 12, likely required as part of a move-in request, is accepted and executed in an extremely short amount of time and, in particular, without requiring a mainstore access.

Significantly, the immediate execution of the data move-out operation requires that a corresponding storage slot in the move-out queue tag buffer 74 and corresponding memory locations in the move-out queue 20 are available. Therefore, in accordance with the present invention, the execution of a move-out operation resulting in the filling of the move-out queue tag buffer 74 exceeding a predetermined limit in turn results in the provision of the buffer full signal on control line 98 to the priority select circuit 82. The move-out tag controller 76 is, again, directed by a priority select signal on the priority select control lines 90 to place a high priority move-out queue read request with the I-BUS 42. The priority assigned to this request is, as before, greater than that of move-in requests originated by the CPUs 12, 12'. Once accepted and posted to a system controller port 44$_{1-n}$, the mainstore server 50 immediately initiates a mainstore write access. Preferably, the move-out queue tag controller 76 utilizes the high priority move-out queue read to transfer out the oldest currently present and valid data from the move-out queue 20. Therefore, the move-out queue tag controller 76 will have specified that data as part of the move-out queue read request. Thus, both the mainstore server 50 and move-out queue server 52 are coordinated as to the mainstore destination address of the data to be read from the move-out queue 20.

In the above circumstance, where a move-out queue read is initiated in response to a move-out queue full condition, the receipt of new data by the CPU 12 is delayed by only the time required for the move-out queue read data and tag to be transferred and latched into the input buffers of the mainstore 18. This transfer is performed generally in parallel with the placing of the MOQ read request, yet sufficiently early so as to guarantee completion immediately prior to acceptance of the high priority read request and action thereon by the mainstore server 18. Thus, the move-out queue 20 and data integrity tag buffer 74 are largely freed while the mainstore write access subsequently completes under the separate direction of the mainstore server 50.

However, also in accordance with the present invention, most move-out queue reads are performed prior to the complete filling of the move-out queue tag buffer 74. That is, the move-out queue server 52 periodically submits low priority move-out queue read requests to the I-BUS 42. Generally, the move-out queue tag controller 76, in the absence of both a move-out queue tag buffer full condition and a move-out queue data integrity search match, preferably will issue a move-out queue read request via the request lines 92 to the I-BUS 42 during the next request arbitration cycle. As each request is placed, the corresponding address tag and data are provided to the input buffers of the mainstore 18 so as to be present in time should the low priority read request be accepted and acted on. Thus for example, when the memory access requirements of the CPU 12 are being met by accesses to the cache 15, a low priority move-out read request may win the I-BUS arbitration and be posted to an available system controller port 44$_{1-n}$. Again, each move-out queue read request preferably specifies the oldest address tag currently present within the move-out queue buffer 74. Upon recognizing the move-out queue read request, the mainstore server 50 initiates a write access of the mainstore 18 to the tag specified mainstore memory address location utilizing the request address tag corresponding data as set up in conjunction with the submission of the MOQ read request. Consequently, the present invention provides for the immediate high-speed performance of data move-out requests and for performing move-out queue reads in a background mode utilizing otherwise wasted opportunities to access the mainstore.

Figure 3:
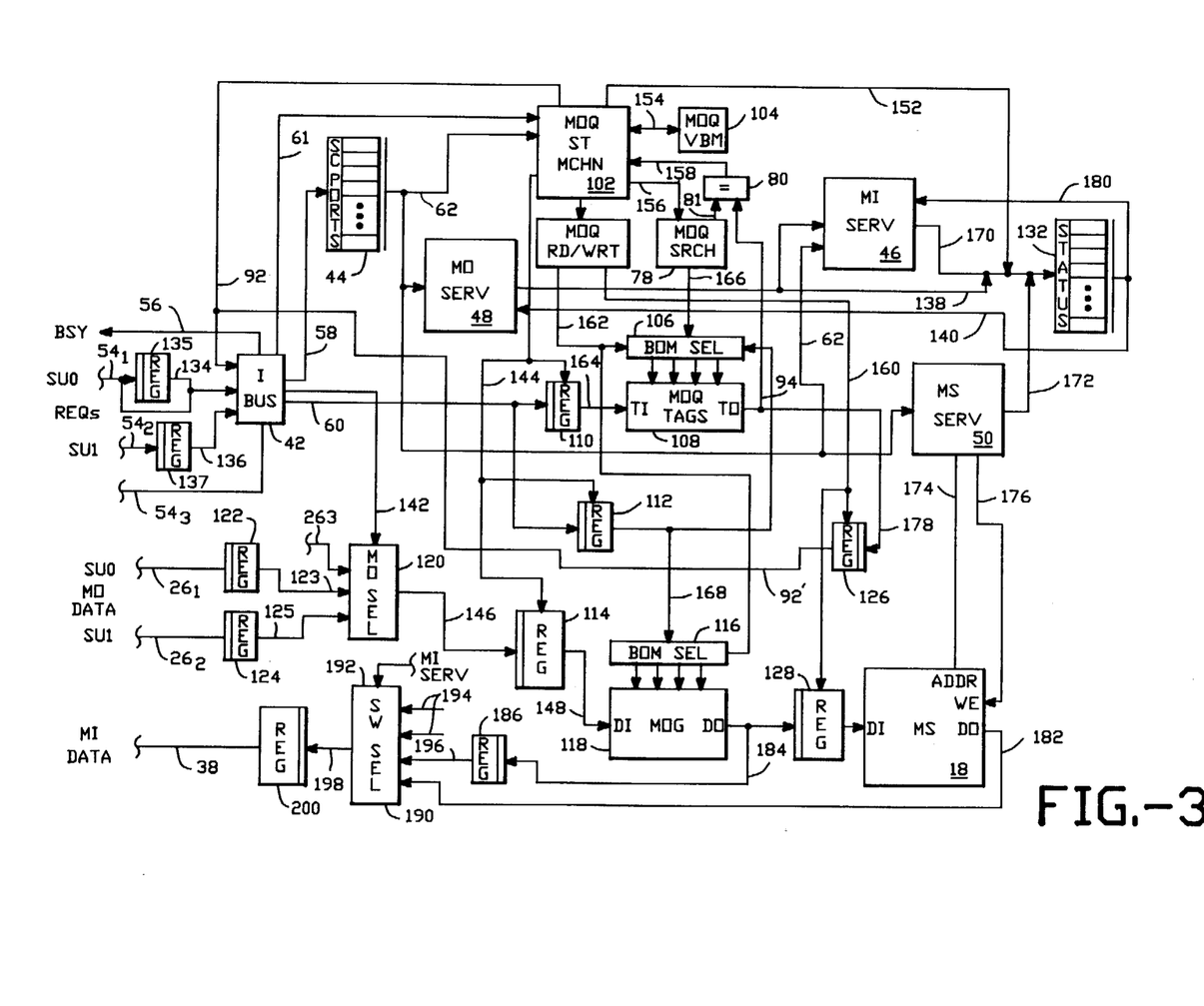
FIG. 3 is a detailed block diagram of the move-out queue buffer, the move-out queue (MOQ) server and the intimately related portions of the system controller in a preferred embodiment of the present invention.

FIG. 3 provides a detailed block diagram of the significant elements of the control, address, and data paths as provided in a preferred embodiment of the present invention. This preferred embodiment provides for the inclusion of two CPU's in a dyadic configuration. Each CPU preferably includes both instruction fetch and data cache memories that are managed, at least in part, by the CPU storage unit (SU). Notationally, the two storage units are identified as SU0 and SU1. As indicated in FIG. 3, requests by the respective storage units, placed via the separate request lines 54$_1$, 54$_2$, are temporarily stored in the request holding registers 135, 137 for the pendency of the I-BUS arbitration. Preferably, the SU0 request is also bypassed immediately to the I-BUS 42. This is allowed in the preferred embodiment due to the close electrical proximity of the system controller and SU0, thereby affording an acceptable direct signal setup period for SU0 requests. The I-BUS 42 also may receive other requests from within the data processing system 10 via the exemplary request line 54$_3$. The current move-out queue read request is placed from a move-out queue state machine 102 of the move-out queue server via the system controller internal request lines 92.

Preferably each request placed to the I-BUS 42 includes a system address specifying the data requested and an instruction, or opcode, indicating the nature of the request. Table I provides a description of the preferred, system address subfields while Table II provides a detailed description of a preferred request format.

TABLE I

| System Address - 3:28 (bit 3 MSB) | |
|---|---|
| Address Tag - | 3:25 |
| MOQ Tag Index - | 23:25 |
| Double Word Index - (8 Byte) | 26:28 |

TABLE II

| System Controller Request | |
|---|---|
| Address Tag - | 26 bits (3:28) |
| Request OpCode - | 7 bits |
| Line Validity/Status - | 2 bits (not always present) |

In the preferred embodiment of the present invention, a data line consisting of 64 sequential bytes of data is utilized as the standard data unit quantity. The double word index identifies a specific group of eight bytes in a line of data while the MOQ tag index specifies the one of eight logically neighboring data lines specified by an address tag.

The bit coding of the request opcode will identify the request as one for a move-out of a data line and its respective sourcing cache memory, a move-in of a data line generally from mainstore (though the data line source is specifically identified in response to the data integrity search for all instances of the requested data within the data processing system 10), either a high or low priority move-out queue read or to perform some other unrelated system controller function.

The system controller ports 44 are preferably an array of eight temporary storage registers. Each register preferably provides for the temporary storage of a single, pending data request. Thus, each storage register of the system controller ports 44 includes a system address field of 26 bits for storing a request specified address tag, a seven bit opcode field, two line validity/status bits and a single bit port valid indicator. Table III lists the applicable line validity status states.

TABLE III

| Cache Data Line Validity Status | |
|---|---|
| Public: | read-only data copy |
| Private: | only alterable data copy |
| Invalid: | not a data copy, may be overwritten |

Each port may be individually written by the I-BUS 42, preferably in a first available port sequence until all are in use. That is, respective requests are sequentially posted to SC ports $44_{1-n}$ that have port valid bits set to port invalid. As soon as the request is posted, the port valid bit is changed to indicate the presence of a newly pending request. While eight ports are present, preferably no more than seven are utilized for the storage of pending requests during any given operating cycle. The I-BUS 42 logically utilizes the minimum of one invalid port to effectively partition those ports containing valid pending requests from those that have been satisfied. Consequently, the various servers of the system controller 14 are restrained to sequentially polling only valid pending requests; the polling sequence being reinitiated upon encountering an port invalid bit. The I-BUS, in turn, can add a valid pending request whenever at least a second port is invalidated by the satisfaction of its corresponding request. Accordingly, whenever the I-BUS 42 determines that only a single port of the system controller ports 44 is invalid, it simply refuses to accept any new request.

Another basis for the I-BUS 42 to refuse to accept a particular request arises upon consideration of the tag index provided along with the request. In accordance with the preferred embodiment of the present invention illustrated in FIG. 3, the mainstore 18 is realized as a grouping of eight logical memory planes or basic operating modules (BOMs). Each memory plane is capable of supporting either a read or write access simultaneously with a read or write access of any other memory plane of the mainstore 18. However, only a single access, read or write, is allowed at any particular time to a single memory plane. The tag index is recognized by the I-BUS 42 as a pointer to a particular memory plane of mainstore 18. Should any pending, and therefore prior, request have both the same tag index and an opcode potentially requiring a read or write access of the mainstore 18, then the new request is effectively ignored by the I-BUS 42 to avoid any possible conflict over access to the mainstore 18.

The final basis for the I-BUS 42 to refusing to accept any particular request is as result of arbitration between any otherwise remaining requests concurrently placed with the I-BUS 42. Table IV lists the preferred ordering of request priority assignments, from highest to lowest, that are pertinant to the present invention.

TABLE IV

| Nominal Request Prioritization | |
|---|---|
| MOQ High Priority | : (High) |
| SU1 Move-In | |
| SU0 Move-In | |
| (Other I-Bus Requests) | |
| MOQ Low Priority | : (Low) |

If acceptance of the highest priority request is not disqualified for lack of an available SC port $44_{1-n}$ or as requiring access to a memory plane of the mainstore 18 already in use, the I-BUS 42 accepts and passes the request to the system controller ports 44 via the request lines 58.

Where the accepted request is, for example, to perform a data move-in to the CPU 12, the storage unit of the CPU 12 will have identified the need for a swap move-out of a cache data line as part of the move-in request opcode. This swap required move-in request is placed via the SU0 control and address lines $54_1$ to the I-BUS 42 and request holding register 135. Upon successful arbitration, the full contents of the request is transferred and stored in an available port of the system controller ports 44.

The independent state machine of the move-out server 48 continuously polls the valid ports of the system controller ports 44 for a newly valid pending request as indicated by a change in state of the port valid bit. On recognizing the newly pending swap required move-in request, the move-out server 48 directly initiates a move-out operation by the swap move-in requesting SU. That is, the requesting SU is treated as if it had posted a swap move-out request with respect to the data line to be cleared from the cache in preparation for the move-in. The move-out request is immediately handled by the I-Bus 42 in that the address tag of the move-out data line is passed to the holding register 110 and the corresponding address tag index portion into a BOM select holding register 112. The data transferred by the storage unit with the swap move-out request is latched into the holding register 122. Separately, but generally in parallel, the move-out queue state machine 102 of the move-out queue server 52 is notified of the swap move-out request by the I-Bus 42 via control lines 61. The move-out queue state machine 102 then waits for the data address tag and data to become available at the inputs to the holding registers 110, 112, 114. The move-out queue server 52 then latches the address tag into the registers 110, 112 while the move-out data from the holding register 122 is passed via data bus 123, the move-out selector 120 and internal data bus 146 to a move-out queue data input holding register 114; the move-out selector 120 being selected in response to control signal from the I-BUS 42 provided via control lines 142. The swap move-out data is then latched into the data holding data register 114 by the move-out queue server 52.

The move-out queue read/write unit 84 then issues a write control signal via control line 162 to the BOM slot selector 106 associated with the move-out queue tag buffer 108 and the BOM slot selector 116 associated with the move-out queue 118. The corresponding slots selected by the selectors 106, 116 are determined by the tag index present in the holding register 112. Thus, the tag index is effectively used as a partition selector for selecting portions of the move-out queue tag buffer 108 and move-out queue 118 corresponding to the memory planes of the mainstore 18. Thus, the move-out queue 118 preferably is logically partitioned into eight storage areas, each corresponding to a memory plane of the mainstore 18 and having a data storage capacity of four 64 byte lines. Similarly, the move-out queue tag buffer 108 preferably includes eight partitions each having a storage capacity of four respective address tags and tag indexes. However, a data line is not transferred in its entirety. Instead, the swap move-out is accomplished as a series of four transfers of 16 bytes each as is necessary to move out a complete data line. Once completion of the move-out queue write operation is assured, the move-out queue server 52 provides a status bit via control lines 152 to the status register array 132 indicating the pending conclusion of the swap move-out.

The mainstore server 50, upon polling the prior pending move-in request and without waiting for the posting of the swap move-out complete status bit, initiates a read access of the mainstore 18 utilizing the data address tag and tag index provided as part of the data move-in request. The mainstore read access is preferably initiated immediately owing to the long read access period required to return the specified data.

The move-in server 46, also polls the system controller ports $44_{1-n}$ to obtain the pending move-in request. Upon recognizing the opcode of the move-in request, the move-in server 46 then generally awaits the conclusion of a data integrity search to determine whether any version of the request specified data is present outside of the mainstore 18. The data integrity search is further performed to determine whether each matching address tag found is valid and specifies either a public or private copy of the data line. Significant with respect to the present invention, this data integrity search requires that the data present in all cache memories 15, 15' of the data processing system 10 be checked. In the preferred embodiment of the present invention the data integrity search of cache memories 15, 15' is performed in four distinct cycles or flows. In accordance with the present invention, the move-out queue server 52 provides for a simultaneous four cycle data integrity search of the move-out queue tag buffer 108 so as to produce search results simultaneously with the production of results from the respective cache memories 15, 15'. A time and hardware efficient search is made possible in the present invention by the use of the index tag in selecting the MOQ storage locations for storing the data address tags. Consequently, only that portion of the MOQ tag buffer matching the tag index of the request need be searched. Further, the preferred provision of specifically four storage slots per MOQ partition allows the MOQ data integrity search to be exactly matched to the four flow/search cycles of the cache memories.

Preferably, the move-out queue state machine 102 is directed to perform the move-out queue tag buffer data integrity check by logic associated with the system controller ports 44. Thus, the search is initiated immediately on the posting of any move-in request to a port $44_{1-n}$. Both the address tag of the requested data and its tag index are passed by the state machine 102 to the move-out queue search unit 78. In turn, the search unit 78 applies the tag index to the BOM selector 106 to select the corresponding one of the eight partitions of the move-out queue tag buffer 108 for searching. A move-out queue read/write unit 84 then directs four successive reads from the move-out queue tag buffer of the address tags contained in the selected partition. The address tags are passed from the move-out queue tag buffer output bus 94 to the address tag comparitor 80 along with the request specified address tag as provided via lines 81. The move-out queue state machine 102 thus receives a comparison match indication via control line 158 for each of the four potentially request specified address tags. The move-out queue valid bit map 104 is referenced simultaneously with each of the four move-out queue tag buffer writes to determine whether the address tag present is indeed a valid tag. The move-out state machine 102 posts the results of the move-out queue tag buffer search to the status register 132.

The move-in server 46, upon recognizing the end of search indication posted to the register array 132, reads the data integrity search results as present in the status register array 132 via the status output bus 180. If the only valid copy of the requested data is present in the mainstore 18, the move-in server 46 awaits the conclusion of the mainstore read access initiated by the mainstore server 50. Upon completion, a mainstore select control signal is provided on the switch selector control lines 192 to the switch selector 190. Preferably, the data from the mainstore 18 is then routed through the switch selector 190 and latched into a move-in data holding register 200. The requested move-in data is therefore subsequently available to the storage unit of the requesting CPU 12 via the common CPU input data bus 38.

If, as a result of the data integrity search, a matching valid address tag is found in the move-out queue tag buffer, the move-out queue state machine 102 provides the matching data address tag to the status register array 132 as part of the search results. The move-in server 46 preferably immediately recognizes the present availability of the move-in requested data, in addition to the search complete indication, and provides a move-out queue by-pass switch select control signal to the switch selector 190 to select the data from the move-out queue holding register 186. The move-in server 46 then signals the waiting move-out queue state machine 102 to begin a move-out queue buffer read. Thus, the move-in data requested is passed through the switch select 190 and into the move-in data holding register 200 to await transfer to the requesting CPU 12. Finally, the corresponding move-in request present in the system controller ports $44_{1-n}$ is marked invalid in response to the move-in server 46 posting a data transfer completed status in the status registers 132.

A move-out queue read operation is generally initiated by the move-out queue state machine 102 by the placement of a move-out queue read request to the I-BUS 42 via request lines 92. In formulating the request, the move-out state machine 102 preferably directs the move-out queue read/write unit 84 to select and latch a data address tag from the move-out queue tag buffer 108 into a request tag holding register 126. This tag is thus provided by lines 92' as part of the move-out queue read request to the I-BUS 42. The priority level of the move-out queue read request is selected internally by the move-out queue state machine 102 by reference to a move-out queue valid bit map 104 as read via the bit map bus 154. The move-out queue valid bit map 104 is constantly maintained by the move-out queue state machine 102 to reflect both the availability and location of storage slots within the move-out queue tag buffer 108 and, therefore, the move-out queue 118. Whenever data is present in and only partially fills, at most, each slot of the move-out queue 118, as indicated by corresponding bits set in the valid bit map 104, the move-out queue state machine 102 issues its normal, low priority move-out queue read requests during each arbitration cycle of the I-BUS 42. The move-out read requests will be periodically submitted until the move-out queue is completely emptied.

However, whenever a slot of the valid bit map becomes filled, the move-out queue state machine 102 instead writes an address tag and corresponding data into the tag and data holding registers 126,128. The tag and data are then latched in response to a move-out queue state machine control signal provided via line 160. The move-out queue state machine then selects and issues high priority move-out queue read requests until a move-out queue read is accepted. An explicit grant control signal from the I-BUS 42 to the move-out queue state machine 102 is provided once the high-priority move-out read request has been accepted. The explicit grant control signal is provided via control lines 61. As before, the high priority request is presented to the I-BUS 42 and, along with any other requests, is arbitrated. Assuming a successful arbitration, the request is posted to an available port of the system controller ports 44. As soon as the explicit grant control signal is received, the move-out queue state machine 102 updates the valid bit map 104.

In parallel, but separately from the move-out queue server 52, the mainstore server 50 also polls and recognizes the move-out queue read request newly pending in the system controller ports $44_{1-n}$. The mainstore server 50 responds by initiating a mainstore write access based on the address tag specified in the request. That is, the mainstore server 50 provides the address tag, via control lines 174, and a write enable signal, via control line 176, directly to the mainstore 18. Due to the substantially longer access time of the mainstore 18, with respect to the read access time of the move-out queue 118, the address tag and data in the data holding register 128, are directly available to the mainstore 18 well within the address and data setup times required for mainstore write accesses. Consequentially, there is no need for close inter-server communication between the move-out queue server 52 and mainstore server 50. However, the mainstore server does provide notice via control lines 172 to the status register array 132 on completion of the mainstore write access. In response to the posting of this notice, the corresponding move-out queue read request in the SC port array 44 is invalidated.

Consequently, a significant improvement in the architecture of cache memory based computer architecture, wherein a move-out queue buffer is provided interposed in the data path between the various cache memories of the data processing system and the mainstore memory unit, has been described.

From the foregoing disclosure of the present invention, it is to be understood that many modifications and variations of the present invention are contemplated. It is also recognized that many variations are possible by those skilled in the art without departing from the nature and scope of the invention as taught above and as hereinafter defined by the appended claims.

We claim:

1. A queue buffer for preventing mainstore memory access contention between data line move-out and move-in requests issued from any of a plurality of logical request sources during an arbitrated request acceptance cycle, the requests including a data move-out request for the transfer of a data line present in a cache memory of a central processor to a mainstore memory, and a move-in request, specifying a data line by an address tag, for transfer to the cache memory, said queue buffer comprising:
   (a) a first buffer memory having a plurality of data line storage locations;
   (b) a second buffer memory having a plurality of address tag storage locations;
   (c) control means for receiving and executing requests received from the plurality of logical request sources, said control means receiving the requests in the performance of an arbitrated request acceptance cycle wherein a received request is selected for execution, said control means including means for receiving a cache data line and address tag provided with a first data move-out request, said control means receiving and storing said cache data line at a first storage location within said first buffer memory and the address tag of said cache data line at a corresponding storage location within said second buffer memory; and
   (d) background means, coupled to said control means as one of the plurality of logical request sources, for providing a second data move-out request to said control means for the transfer of a data line and address tag to said mainstore memory, said background means being coupled to said control means for determining the number of data lines stored in said first buffer means, said background means providing said second data move-out request to said control means during each arbitrated request acceptance cycle when more than a predetermined number of data lines are stored in said first buffer memory, said background means issuing said second data move-out requests at a priority less than that of said first move-out request and that of requests for the move-in data from mainstore memory.

2. The queue buffer of claim 1 further comprising:
   (a) search means, responsive to said control means, for determining the presence of a requested data line is said first buffer memory by inspection of the address tags stored by said second buffer memory; and
   (b) select means, responsive to said search means, for altering the priority of said second data move-out requests as issued by said background means to a priority greater than that of said first move-out request and that of requests for the move-in of data from mainstore memory.

3. The queue buffer of claim 2 further comprising determining means, responsive to said control means, for determining the availability of locations within said first and second buffer memories for the storage of data lines and address tags, said determining means being coupled to said control, search and select means for respectively indicating the next available locations for buffer storage use, validity of data line and address tags at each location and for altering the priority of said second data move-out requests as issued by said background means.

4. The queue buffer of claim 3 further comprising a validity data bit map searchable by said determining means and wherein the bit locations within said validity data bit map corresponding to the locations within said first and second buffer memories.

5. The queue buffer of claim 4 wherein said first and second buffer memories are comprises of a plurality of corresponding arrays of said storage locations, wherein said control means stores each said data line and respective address tag to one of corresponding arrays of said storage locations determined by an address tag subfield within each address tag and wherein said search means compares the address tag provided with a request with the address tags of the one of said corresponding arrays of said second buffer memory having a like address tag subfield.

6. A computer system architecture comprising:
   (a) a central processor unit having a store-to cache memory for the local storage of a plurality of data lines;
   (b) a mainstore memory unit coupled to each said central processor unit by a move-in data bus for the receipt of data lines;
   (c) a move-out queue buffer connected between said central processor unit and said mainstore memory unit by respective move-out and mainstore write data buses, said move-out queue buffer having a plurality of storage locations for the temporary storage data lines; and
   (d) system controller means for managing the transfer of data lines between said central processing unit and said mainstore memory unit, said system controller means being responsive to requests issued by said central processing unit to initiate the transfer of data lines with respect to said central processing unit and to first and second priority level requests to initiate the transfer of data lines from said move-out queue buffer to said mainstore memory unit, said system controller means including:
      (i) means for prioritizing the acceptance of requests as received by said system controller during a request acceptance arbitration period, the data line requests of said central processing unit being assigned a high priority level relative to other requests issued to said system controller means;
      (ii) means for determining whether a data line is present in said move-out queue buffer and whether a predetermined number of data lines are present in said move-out queue buffer, and
      (iii) move-out queue controller means, responsive to said prioritizing and determining means, for controlling the receipt and storage of data lines by said moveout queue buffer and the transfer of data lines from said moveout queue buffer to said mainstore memory unit and for selectively issuing said first or second priority level requests to said system controller means for initiating the transfer of a data line from said move-out queue buffer to said mainstore memory unit, said first priority level being a low priority level relative to the high priority level of said central processor unit data line requests and said second priority level being of a higher priority level relative to the high priority level of said central processor unit data line request, said move-out queue controller means normally providing said first priority level request to said system controller means during each request acceptance arbitration period whenever said determining means determines that a data line is present in said move-out queue buffer, said move-out queue controller means selecting to issue said second priority level requests whenever said determining means determines that said predetermined number of data lines are present in said move-out queue buffer.

7. The computer system architecture of claim 6 wherein each data line is identified by an address, wherein requests for the move-in of data lines specify the address of the requested data line, and wherein said system controller means further includes:
   (a) a plurality of address storage locations for the storage of the respective addresses of the data lines stored in said data storage locations;
   (b) search means for determining whether the address of a data line specified by a request for the move-in of a data line is stored in any of said plurality of address storage locations; and
   (c) bypass means, responsive to said search means, for transferring the data line from the one of said plurality of data line storage locations corresponding to the address storage location determined by said search means to contain a request specified address, the data line transferred by said bypass means being routed onto said move-in data bus.

8. The computer system architecture of claim 7 wherein a swap/move-in request is issued by said central processing unit, the swap/move-in request including an address of a data line to be moved-out of the said cache memory of the requesting said central processing unit, wherein sets of said data storage location have corresponding queue addresses, wherein each data line addresses includes an address index, wherein said move-out queue controller means immediately accepts the move-out data line provided by the requesting said central processing unit upon acceptance of said swap/move-in request by said prioritization means, said move-out queue controller means selectively storing the move-out data line in said move-out queue buffer in one said data line storage locations having a queue address matching the address index corresponding to the move-out data line, and wherein said search means selectively searches said plurality of address storage locations by searching only the ones of said plurality of address storage locations corresponding to queue addresses that match the address index of the requested move-in data line address.

9. A computer system comprising:
   (a) a central processing unit, said central processor including a local data store for the storage of a plurality of data lines, said central processor unit providing data line transfer requests of a first predetermined priority level;
   (b) a mainstore memory unit for storing a plurality of data lines, said mainstore memory unit being coupled to said central procesor unit for the transfer of data lines from said mainstore memory unit to said central processor unit;
   (c) move-out queue means for storing a plurality of data lines, said move-out queue means being coupled to said local data store and said mainstore memory unit for the transfer of data lines from said local store to said move-out queue means and from said move-out queue to said mainstore memory unit;
   (d) move-out queue control means for providing data line transfer requests of a second predetermined priority level to transfer data line present in said move-out queue means to said mainstore memory unit while more than a first predetermined number of data lines are present in said move-out queue buffer; and
   (e) control means, coupled to said central processor unit and said move-out queue control means to receive data line transfer requests provided thereby, for controlling the transfer of data lines between said local data store, said move-out queue means and said mainstore memory unit, said control means including arbitration means for accepting the highest priority level data line transfer request received by said control means during an arbitration period, the first predetermined priority level being of higher priority than said second predetermined priority level.

10. The computer system of claim 9 wherein said move-out queue control means provides for data line transfer requests of a third predetermined priority level to transfer a data line present in said move-out queue means to said mainstore memory unit while more than a second predetermined number of data lines are present in said move-out queue buffer, said third predetermined priority level being of higher priority than said first predetermined priority level.

* * * * *